Patented Nov. 23, 1943

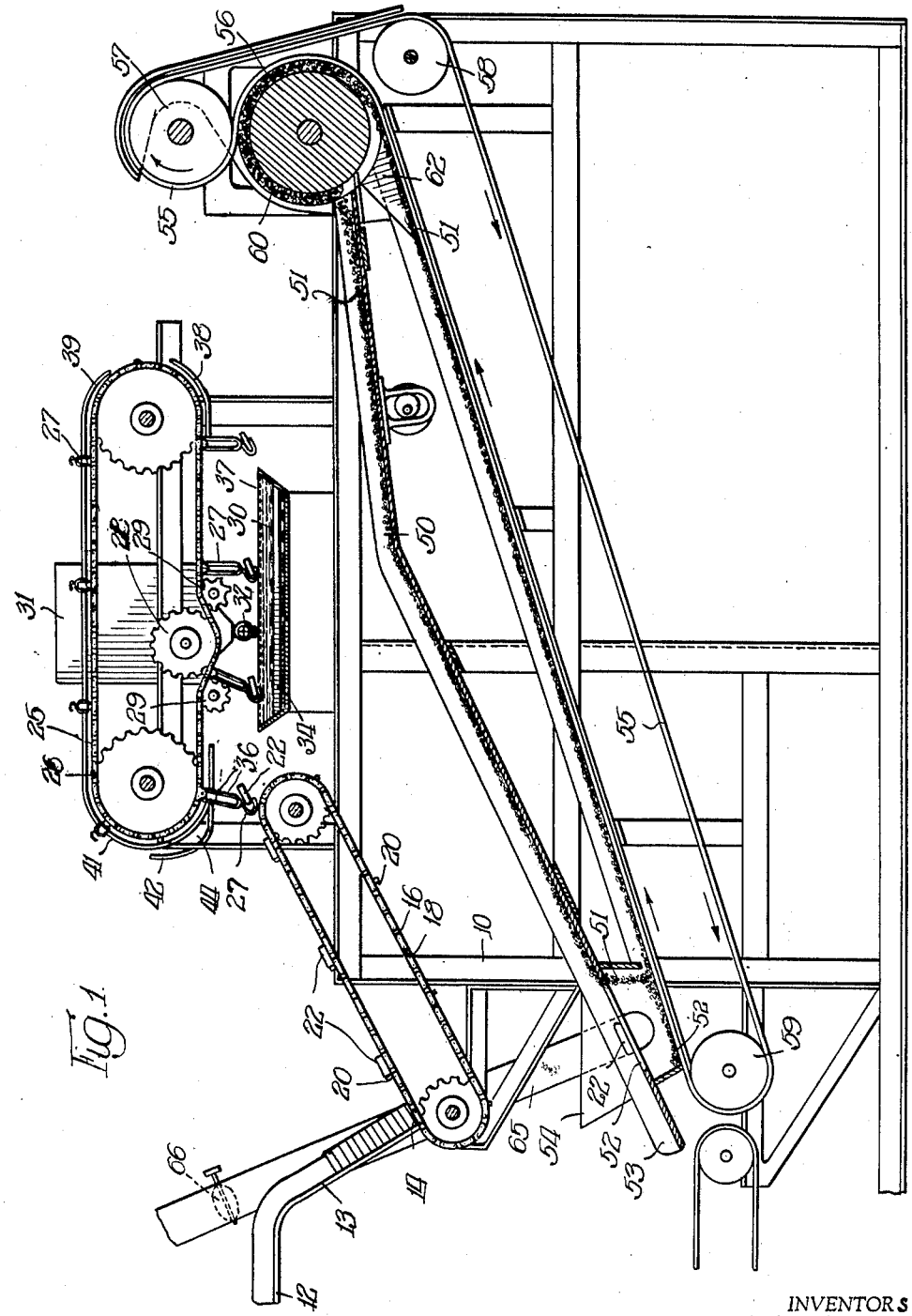

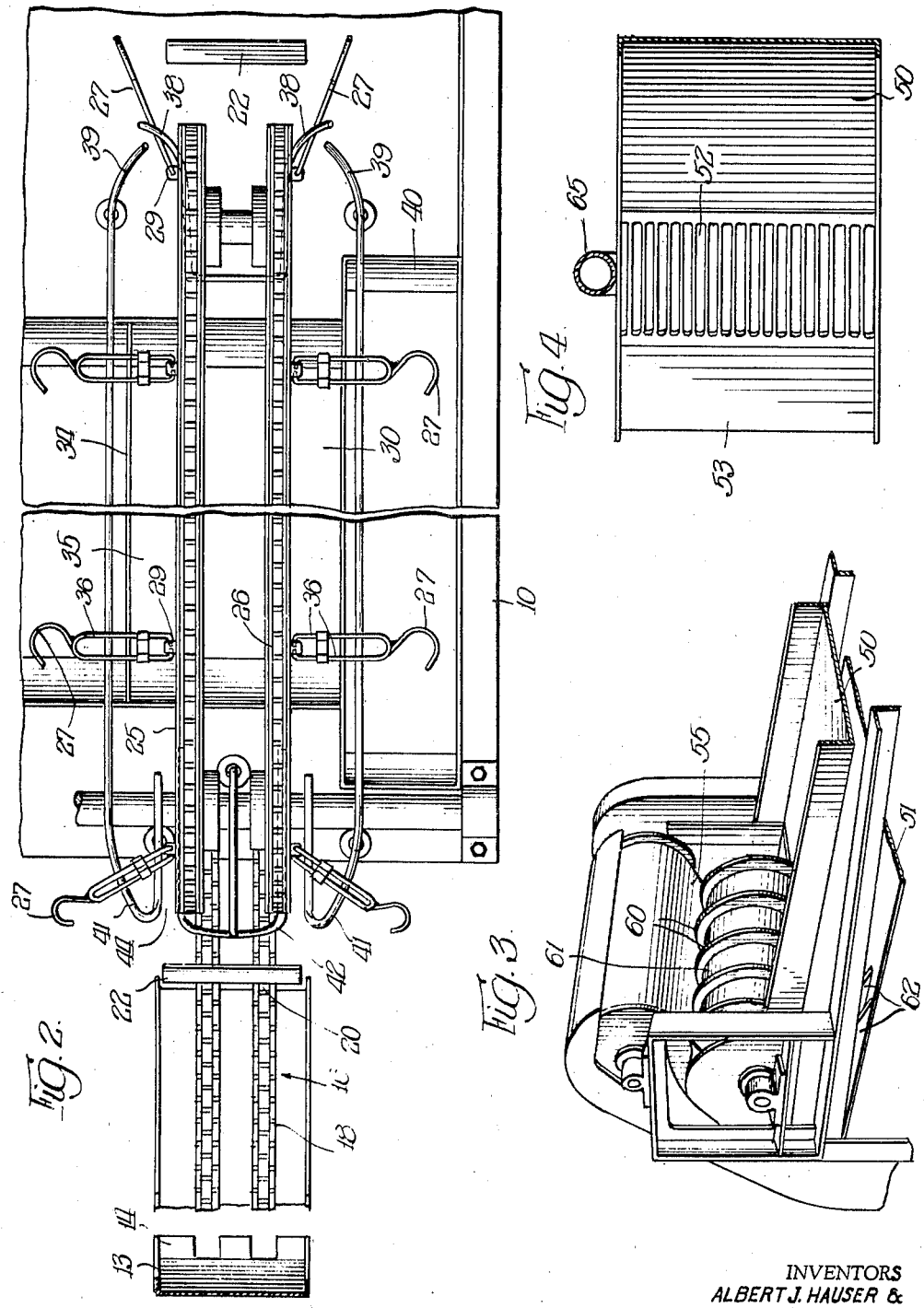

2,335,118

UNITED STATES PATENT OFFICE 2,335,118

COATING DEVICE

Albert J. Hauser, Bloomington, and Albert J. Stalter, Normal, Ill., assignors to Paul F. Beich Company, Bloomington, Ill., a corporation of Illinois Application May 15, 1940, Serial No. 335,410

6 Claims. (Cl. 91—4)

The present invention relates to improvements in a coating device and more particularly to a machine for coating candy bars and a method for accomplishing this result.

Heretofore in candy coating machines it has been customary to have a pan or kettle of coating material maintained in a fluid state and to dip candy to be coated into this material intermittently with a consequent loss of time and additional expense. Another method heretofore used is a continuous operation wherein a large wheel or roller is partially submerged in the pan or kettle and has candy holding means associated therewith. Upon the rotation of the roller, candy is carried through the pan, coated, and removed from the roller by another operation. The use of this large roller in the pan tends to cool the coating material and requires means such as a doctor blade to scrape coating material from the roller and cause it to drip back in the pan. If the coating material hardens quickly, there is a waste of material through hardening upon the roller.

In some installations the coating material is sprayed or painted over the bars again cooling the material and requiring extensive heating thereof to restore it to a proper fluid state.

Applicant's machine and method provides an inexpensive means and manner of coating candy whereby the coating material is conserved and the operation is carried on continuously. From this original coating the bars may receive a further coating of nuts or other material evenly spread thereon and the candy may be automatically separated from the second coating material with a return of the unused material for re-use.

One object of the present invention is to conserve coating material. Another object is to obtain an even coating for candy bars. A further object is to provide a relatively inexpensive and simple structure for automatically and continuously coating candy bars. A still further object is to provide a compact unitary structure for coating candy that will conserve space and require a minimum of maintenance and supervision.

Yet further objects will become apparent from a study of the specification and drawings hereto attached which describe and disclose a machine comprising one embodiment of the invention or one structure by which the new method may be practiced.

In the drawings:

Fig. 1 is a diagrammatic sectional view of an apparatus comprising one embodiment of the present invention;

Fig. 2 is a plan view of a portion of the apparatus of Fig. 1;

Fig. 3 is a view in perspective of a portion of the apparatus shown at the extreme right in Fig. 1;

Fig. 4 is a plan view of a portion of the lower conveying means shown in Fig. 1.

To accomplish the objects of this invention, candy bars are moved continuously forward from a feeding station along a conveyor mechanism, caused to dip quickly through a primary coating bath and are released to a second conveying mechanism where they are returned while receiving a secondary coating through an intimate intermixing therewith. The double coated candy bars are then separated from the secondary coating material and delivered from the apparatus. The unused secondary coating material is continuously returned for coating further bars.

It will be noted that from the loading of the machine with candy bars to be coated to its delivery as coated candy that the operation is continuous and automatic. Through the use of the structure shown the candy bars are properly spaced one from another, the duration and evenness of the coating can be predetermined, and the coating material is conserved.

Conveying or carrying means is used to space the bars and to carry them to the dipping mechanism where relatively small gripping members pick up the bars and pass them through the coating pan and release or expel the bars to be further treated with nuts or other secondary coating. If nuts are used for the secondary coating they may be continuously brought under the bar releasing means so that the bars and nuts can be intermixed, the nuts then separated from the bars and the unused nuts returned again under the bar releasing means.

One embodiment of a structure for accomplishing these results will be noted in the drawings. With reference thereto it will be noted that in Fig. 1 there is a frame 10 for supporting the various mechanisms in the device. For convenience a bar feeding station may be incorporated in the frame 10 or may be supported from an auxiliary frame. The bar feeding station may include a bar support 12 and an inclined chute 13 terminating in spaced finger members 14 providing a seat for a bar to be picked up and carried through the coating operations.

Supported in the frame 10 is a conveying or carrying means 16 in the form of spaced endless chain members 18 so mounted that each of the chain members 18 is positioned beneath one of the spaces between the finger members 14. Oppositely disposed studs 20 are mounted at spaced intervals upon the chain members 18 for passage between the finger members 14 to pick up a candy bar illustrated at 22 to carry it through the coating device. It will be apparent that when the lowermost bar on the fingers 14 is removed by a pair of studs 20, the bars in the chute 13 will move downwardly to seat another bar upon the finger members 14 in proper position to be picked up by another pair of studs 20.

The conveying means 16 may lead upwardly adjacent and beneath a second conveying or carrying means 25 horizontally disposed in the frame 10, and mounted for synchronous movement with the conveying means 16. The chain or link members 26 in the conveying means 25 may have bar securing means attached thereto in the form of pairs of spaced, oppositely-disposed hinged or pivoted hook members 27 which depend downwardly adjacent the bar carrying studs 20 at the upper end of the conveying means 16. These hook members 27 may include one or more small bars 36 joined rigidly at one end to a link 26 in the conveying means 25 and at their other end rigidly to the hook portion 27. Spaced bars 36, forming a perforate member, may pass through a relatively thick bath of material without picking up or wasting any substantial amount of coating. The two conveying means are so synchronized that a pair of hook members 27 will grasp a bar 22 from a pair of studs 20 at the upper extent of the conveying means 16 and transfer the bar to the conveying means 25 for treatment.

Disposed between the ends of the conveying means 25 and in engagement with the lower line of travel of the endless chain members 26 is a sprocket wheel or sprocket wheels 28 beneath which the chain members 26 must travel. The wheel 28 is so mounted as to cause the chain members 26 to move beneath the normal line of their travel and to dip the hook or gripper members 27 and the suspended bar out of and beneath the line of travel at that point. Guide wheels 29 mounted adjacent the wheel 28 hold the chain members 27 in proper position at that point.

Beneath the wheel 28 is a pan or kettle 30 containing coating material in a fluid state and heating means such as the unit 31 may be installed adjacent the pan for this purpose. A coating material supply container may be mounted above the pan 30 within the unit 31 with a supply conduit 32 leading therefrom to the pan 30. This supply may be operated automatically according to the number of bars fed through the pan or a hand adjusted valve control member may be inserted in the conduit 32 for maintaining a proper level in the pan 30.

The gripper members 27 may be attached to or from a part of the link members in the conveying members. Such attachment will cause the outer ends of the hook members to move in a reverse direction as the links begin their travel around wheel 28. The hook members with their suspended load are then dipped or passed rapidly through the coating material in the pan 30 at an increased speed over that of the travel of the links themselves as they pass about the wheel 28.

Where more than one conveying means 25 are mounted side by side for increasing the operation of the device, the pan 30 is preferably divided longitudinally in the direction of the travel of the conveying means by dividers 34 arranged on either side of the various pairs of hook members 27 (see Fig. 1). These dividers do not extend to the bottom of the pan 30 so that a constant level of material may be kept in all of the chambers 35 thus formed from the one conduit 32. The purpose of these dividers is to tend to keep a normal level in the other chambers 35 while a bar 22 and its hook members 27 are traveling through one chamber 35. This tends to prevent the lurch or dip given to the hook members by the increased speed in traveling about the wheel 28 from disturbing the level in other chambers than the one through which it is traveling. Preferably the hook members in this construction are so spaced that only one pair of hook members from a conveying means 25 passes into the pan 30 at any one time.

The conveying means is returned to its normal line of travel carrying the coated bar 22 outwardly over a drip pan 37 to catch any excess coating material that may drip therefrom. At a suitable place releasing or expelling means is provided to force the bar 22 from the hook members 27. The releasing means shown is in the form of rails or guide members 38 so disposed in the frame 10 that a contact will be established between these members and the hook members 27 causing the latter to swing outwardly on their hinge or pivot means 29 off the ends of the bars 22, releasing the bars 22 for further treatment.

When the hook members 27 are forced outwardly by the releasing means 38 they are caused to fall against the guide or supporting members 39 as they travel upwardly and backwardly for a return to the feeding end of the device and to slide along these guide members in an outwardly spread position so that any coating remaining thereon or dripping therefrom will not fall upon the conveyor mechanism. Drip pans 40 may extend along the frame 10 beneath the outwardly extended hook members to catch further drippings.

As the hook members 27 approach the feeding end of the device, the supporting rails 39 are bent inwardly and downwardly as at 41 which causes the hook members to converge or to assume a more perpendicular position relative to the chain members to which they are secured to place them in readiness for grasping another bar 22 as they approach carrying means 16. To prevent a swinging action of the hook members and to position them more accurately to seize a bar 22, a stop or aligning means such as the substantially U-shaped curved bar 42 may be mounted between the supporting rails 39 to form an aligning groove 44 above and adjacent the upper end of the conveying means 16 to bring the hook members down adjacent cooperating studs 20 and outwardly of them as shown.

When the bars 22 are dropped through contact of the hook members with the releasing means 38 they may be further treated or removed for cooling or packaging. The present disclosure shows structure for treating the bars with a secondary coating such as nuts and incorporates this structure with the primary coating structure to make a compact unitary machine with no additional waste of floor space.

The released covered bars fall upon a preferably tilted bed or shaking conveying means 50 where they are shaken or tumbled about and thoroughly intermixed with nuts or other secondary coating material 51. The primary coating, still warm and in a semi-fluid or tacky state, readily picks up a sufficient secondary coating that becomes imbedded therein. When the primary coating is covered, excess secondary coating material will merely travel along with the bar 22. The coating material and the bars are shaken down to a screen member 52 which the bars, now having a double coating, pass over on to a discharge pan 53 that may lead to a further conveyor not shown or on to a packaging table.

The nut meats 51 pass through the screen member 52 into a hopper 54 which directs them on to a nut conveying means 55 shown as a traveling endless belt. The nut meats are carried upon this belt to a drum 56. The belt travels beneath and up behind this drum and over it to an upper drum 57 mounted over and in contact with portions of the lower drum 56 through the belt. From the drum 57 the belt is fed to an idler roll 58 below the lower drum 56 and is returned below the screen member 52 to the idler roll 59.

Mounted upon the lower drum 56 are the divider or channel members in the form of circumferential vanes 60 which form a bearing surface for contact with the belt. The nut meats may thus be brought up over the lower drum through the channels 61 thus formed between the divider members and dropped on to the shaking conveyor 50 without being crushed between the belt and the drum proper. As the nut meats travel from the screen member 52 they are caused to pass between guide members 62 positioned before the channeled drum 56 and are separated to pass between the divider members with which the guide members cooperate to pass them into proper channels 61. This prevents a bunching of the nut meats on the shaking conveyor and establishes a thinner even layer of meats for mixing with the bars 22. Again as the nut meats approach the expelling means to receive a bar to be coated, the action of the shaking conveyor spreads this secondary coating to a substantially even layer.

Leading into the hopper or bin 54 is a conduit 65 that may lead from a secondary coating supply reservoir to bring fresh nut meats to the belt 55. This supply may be automatically operated by means not shown to supply fresh nut meats according to the number of bars treated or a hand operated gate 66 may be inserted in the conveyor for this purpose.

It will be noted that with the use of the structure shown and described, a double coating with practically no waste of material can be given to the bars.

We claim:

1. In a coating device for candy bars, means adapted continuously to carry candy bars in a suspended, spaced relationship, including a continuous traveling endless conveying means having upper and lower runs, said upper and lower runs being in the same vertical plane, hook members hingedly mounted to said conveying means in spaced relation to each other and adapted to be suspended therebelow, means adjacent the forward end of said conveying means for feeding candy bars to said hook members at spaced intervals, a coating bath below said conveying means, means associated with said conveying means to sweep and dip said bars and portions of the suspended hook members momentarily through into said bath at increased momentum, means adjacent the other end of said conveying means for releasing said bars from said hook members, said releasing means causing said hook members to move outwardly in a different plane position on their hinged mounting to prevent dripping of coating material on said conveying means while returning therealong, means to support said hook members in said different plane position during their return along said conveying means to said feeding means, and to align said hook members at the forward end with said feeding means.

2. In a coating device for candy bars, an endless conveying means for a plurality of lines of articles to be coated, a coating means adjacent the line of travel of said conveying means, said coating means including a vat for containing coating material in liquid form for said articles, and dividing strips in said vat between lines of articles on said conveying means and arranged longitudinally of said vat in the direction of travel of said conveying means, said dividing means terminating short of the bottom of said vat to permit liquid communication throughout the divided areas of said vat.

3. A coating device including an endless chain conveying means, a feeding station adjacent said conveying means and a coating station along said conveying means, article carrying members mounted on said conveying means, said carrying members being hinged for a sideways movement with respect to said conveying means, guide means and article releasing means for said carrying members, said releasing means moving said carrying members sidewardly on their hinges into a different plane to permit an article held thereby to drop, and guide means acting to maintain said carrying members in said different plane position and to return them to a carrying position at said feeding station.

4. In a coating device for candy bars, means to continuously carry candy bars in a suspended, spaced relationship, including a continuous traveling endless conveying means having upper and lower runs, said upper and lower runs being in the same vertical plane, hook members hingedly mounted on said conveying means in spaced relation to each other and suspended therebelow, means adjacent the forward end of said conveying means for feeding candy bars to said hook members at spaced intervals, a coating bath below said conveying means, means associated with said conveying means momentarily to dip and sweep said bars and portions of the suspended hook members through said bath below the line of travel of said conveying means in the same direction and at an increased speed thereover, means adjacent the other end of said conveying means for releasing said bars from said hook members, means for said releasing means to cause said hook members to move outwardly in a different plane position on their hinged mounting to prevent dripping of coating material on said conveying means while returning therealong, and means to support said hook members in said different plane position during their return along said conveying means to said feeding means.

5. A coating device as defined in claim 4 wherein drip pans are mounted below said hook members in their outwardly directed position.

6. A coating device as defined in claim 4 wherein said supporting means adjacent the feeding end of said conveying means causes said hook members to return to a suspended candy bar receiving position.

ALBERT J. STALTER.
ALBERT J. HAUSER.